US012428877B2

(12) United States Patent
Gulick, Jr. et al.

(10) Patent No.: US 12,428,877 B2
(45) Date of Patent: Sep. 30, 2025

(54) RECOIL SECURITY APPARATUS FOR PORTABLE ELECTRONIC DEVICES

(71) Applicant: Scorpion Security Products, Inc., Vestal, NY (US)

(72) Inventors: Franklyn W. Gulick, Jr., Binghamton, NY (US); Gary Page, Chenango Forks, NY (US); Patrick McEwen, Greene, NY (US); Andrew Bartoszewski, Syracuse, NY (US); Paul Frydman, Binghamton, NY (US)

(73) Assignee: Scorpion Security Products, Inc., Vestal, NY (US)

( * ) Notice: Subject to any disclaimer, the term of this patent is extended or adjusted under 35 U.S.C. 154(b) by 376 days.

(21) Appl. No.: 17/971,149

(22) Filed: Oct. 21, 2022

(65) Prior Publication Data

US 2023/0037809 A1 Feb. 9, 2023

Related U.S. Application Data

(63) Continuation of application No. 17/164,409, filed on Feb. 1, 2021, now Pat. No. 11,479,993.

(60) Provisional application No. 62/969,522, filed on Feb. 3, 2020.

(51) Int. Cl.

| | |
|---|---|
| ***E05B 73/00*** | (2006.01) |
| ***A47F 7/00*** | (2006.01) |
| ***G08B 21/18*** | (2006.01) |

(52) U.S. Cl.
CPC ............ *E05B 73/0011* (2013.01); *A47F 7/00* (2013.01); *G08B 21/18* (2013.01)

(58) Field of Classification Search
CPC .... E05B 73/0011; E05B 73/0082; A47F 7/00; G08B 21/18; G08B 13/149
See application file for complete search history.

(56) References Cited

U.S. PATENT DOCUMENTS

2015/0108948 A1* 4/2015 Gulick, Jr. ................ H02J 7/00 320/115
2017/0350555 A1* 12/2017 Jertson ................... F16M 11/16
2021/0228000 A1* 7/2021 Schuft ................. E05B 73/0017
2021/0230910 A1* 7/2021 Schuft ..................... E05B 73/00

* cited by examiner

*Primary Examiner* — Quan Zhen Wang
*Assistant Examiner* — Rajsheed O Black-Childress
(74) *Attorney, Agent, or Firm* — Barclay Damon LLP

(57) ABSTRACT

A recoil security apparatus comprises a body extending along a body axis and comprising an inner surface. The inner surface defines a plurality of surface features and surrounds a shaft extending along the body axis. A first holder is supported by the body and a second holder supported by the body. A securing member comprises an outer surface and is configured to traverse the shaft and engage the plurality of surface features. The securing member connects to the first holder at a first end and to the second holder at a second end. Rotation of the securing member in a first direction causes one of the first holder and the second holder to move in a direction away from the body. Alternatively, rotation of the securing member in a second direction causes one of the first holder and the second holder to move in a direction toward the body.

20 Claims, 10 Drawing Sheets

RECOIL SECURITY APPARATUS FOR PORTABLE ELECTRONIC DEVICES

CROSS-REFERENCE TO RELATED APPLICATIONS

This application is a continuation of Non-provisional patent application Ser. No. 17/164,409 filed on Feb. 1, 2021 and claiming the priority and benefit of Provisional Patent Application Ser. No. 62/969,522, filed on Feb. 3, 2020. The entire contents of said application are hereby incorporated by reference.

TECHNOLOGICAL FIELD

This application relates to a security apparatus that coupled to base and is customizable, easily adjusted, locked, and unlocked, and which allows for the functional and secure display of portable or handheld electronic devices.

BACKGROUND

Retailers sell a wide range of portable or hand held electronic devices that assist in or perform a multitude of tasks for the a user or customer. When a customer is looking to purchase such devices, part of the experience is having the ability to examine and test the device in a retail setting. This is done using floor models that are fitted with some form of security apparatus to prevent theft of the portable electronic device.

There are many different types of security apparatuses used in retail settings that enable a portable electronic device to be securely displayed while still allowing the customer to interact with and test the portable electronic device. Unfortunately, the current security apparatuses used by retailers are not able to be easily reconfigured, if at all, for securing different portable electronics. In addition, these security apparatuses at least partially obscure the sides of the portable electronic devices when secured within the apparatus. This makes it impossible to fully interact with portable electronic devices that include wrap around displays. Furthermore, in order to securely display different types and sizes of portable electronic devices, a retailer must purchase different security apparatuses to secure each type and size of device.

These are just some of the problems associated with current security apparatuses for handheld or portable electronic devices.

SUMMARY

In an embodiment, a recoil security apparatus for securing a portable electronic device comprises a body extending along a body axis and comprising an inner surface defining a shaft extending along the body axis, wherein the inner surface defines a plurality of surface features. At least one support extends along the body axis. A first holder is positioned proximate one end of the body and a second holder is positioned proximate an opposing end of the body. The at least one support is configured to couple to at least one of the first holder and the second holder. A securing member comprises an outer surface and is configured to traverse the shaft to connect to the first holder at a first end and to the second holder at a second end. The outer surface defines a plurality of complimentary surface features configured to engage the surface features of the inner surface of the body. A tool interface is defined at one of the first end and the second end and rotation of the securing member at the tool interface in a first direction causes one of the first holder and the second holder to move in a direction such that it is driven away from the body. Alternatively, rotation of the securing member at the tool interface in a second direction causes the one of the first holder and the second holder to move in a direction such that it is driven toward the body.

In an embodiment, the body of the recoil security apparatus is configured to be coupled to a base and the base is configured to be secured to a display surface. In an embodiment, the first holder and the second holder are removeably coupled to the body. In a further embodiment, at least one of the first holder and the second holder further comprises, an end plate, a bottom lip extending from a bottom of the end plate, and a top lip extending from a top of the end plate. In an embodiment, at least one of the first holder and the second holder defines a pocket configured to support and retain a portion of a portable electronic device. In another embodiment, the recoil security apparatus further comprises an alarm. In still another embodiment, at least one of the first holder and the second holder defines an opening configured to enable access to a power input of the portable electronic device.

An embodiment of a recoil security apparatus for securing a portable electronic device comprises a body extending along a body axis and comprising an inner surface. The inner surface defines a plurality of surface features and surrounds a shaft extending along the body axis. A first holder is supported by the body and a second holder supported by the body. A securing member comprises an outer surface and is configured to traverse the shaft to connect to the first holder at a first end and to the second holder at a second end. The outer surface defines a plurality of complimentary surface features configured to engage the surface features of the inner surface of the body. A tool interface defined at one of the first end and the second end, wherein rotation of the securing member at the tool interface in a first direction causes one of the first holder and the second holder to move in a direction such that it is driven away from the body. Alternatively, rotation of the securing member at the tool interface in a second direction causes one of the first holder and the second holder to move in a direction such that it is driven toward the body.

An embodiment of a security system for a portable electronic device comprises a security apparatus comprising a body extending along a body axis. The body comprises an inner surface defining a shaft extending along the body axis, wherein the inner surface defines a plurality of surface features. A first holder is supported by the body and a second holder is supported by the body. A securing member comprises an outer surface and is configured to traverse the shaft to connect to the first holder at a first end and the second holder at a second end. The outer surface defines a plurality of complimentary surface features configured to engage the surface features of the inner surface of the body. A tool interface defined at one of the first end and the second end. A base comprising a top surface is configured to support the body of the security apparatus and a bottom surface of the base is configured to couple to a display surface. An alarm comprises at least one alarm trigger positioned at one of the top surface and the bottom surface of the base. At least one sensor positioned within the base is in communication with the at least one alarm trigger and is configured to cause at least one of an audio, a visual, and an electronic signal to be produced in response to tripping the at least one alarm trigger.

BRIEF DESCRIPTION OF DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings in which.

DETAILED DESCRIPTION

The following discussion relates to various embodiments of a recoil security apparatus for portable electronic devices. It will be understood that the herein described versions are examples that embody certain inventive concepts as detailed herein. To that end, other variations and modifications will be readily apparent to those of sufficient skill. In addition, certain terms are used throughout this discussion in order to provide a suitable frame of reference with regard to the accompanying drawings. These terms such as “upper”, “lower”, “forward”, “rearward”, “interior”, “exterior”, “front”, “back”, “top”, “bottom”, “inner”, “outer”, “first”, “second”, and the like are not intended to limit these concepts, except where so specifically indicated. The terms “about” or “approximately” as used herein may refer to a range of 80%-125% of the claimed or disclosed value. With regard to the drawings, their purpose is to depict salient features of the a recoil security apparatus for portable electronic devices and are not specifically provided to scale.

Figure 1:
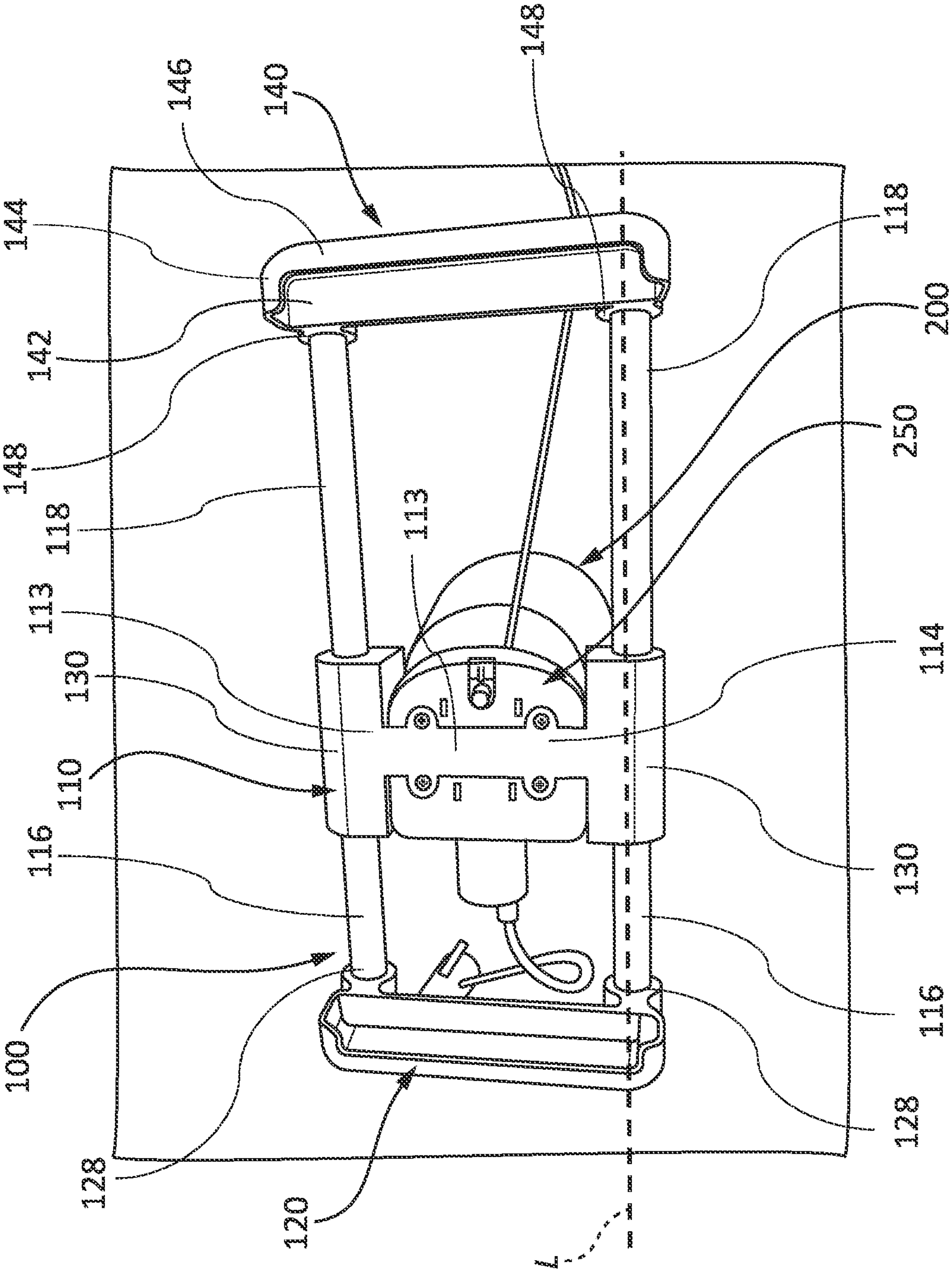
FIG. 1 illustrates a perspective top view of an embodiment of a security apparatus coupled to a base.
Figure 2:
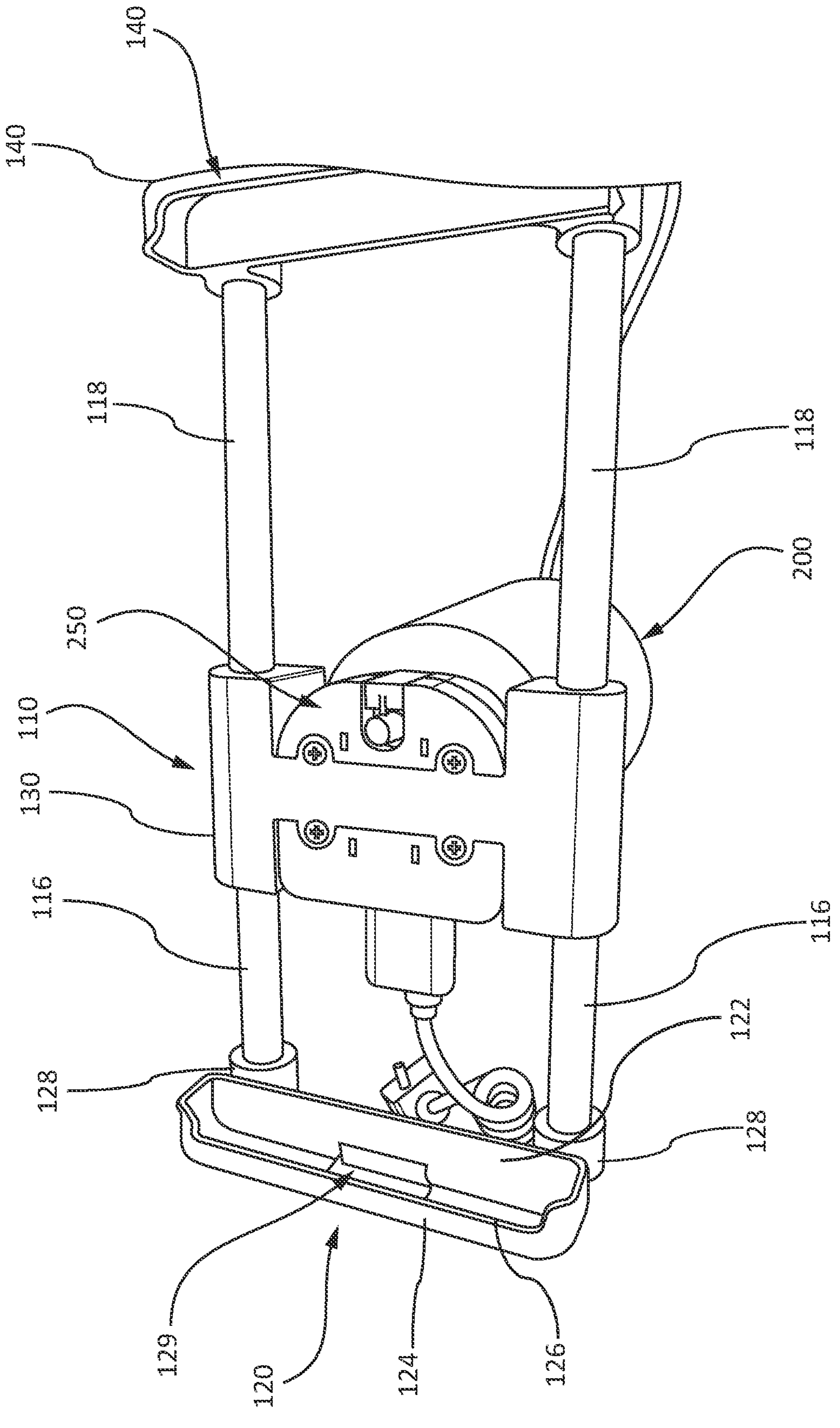
FIG. 2 illustrates a perspective top view of an embodiment of the security apparatus coupled to the base.
Figure 3:
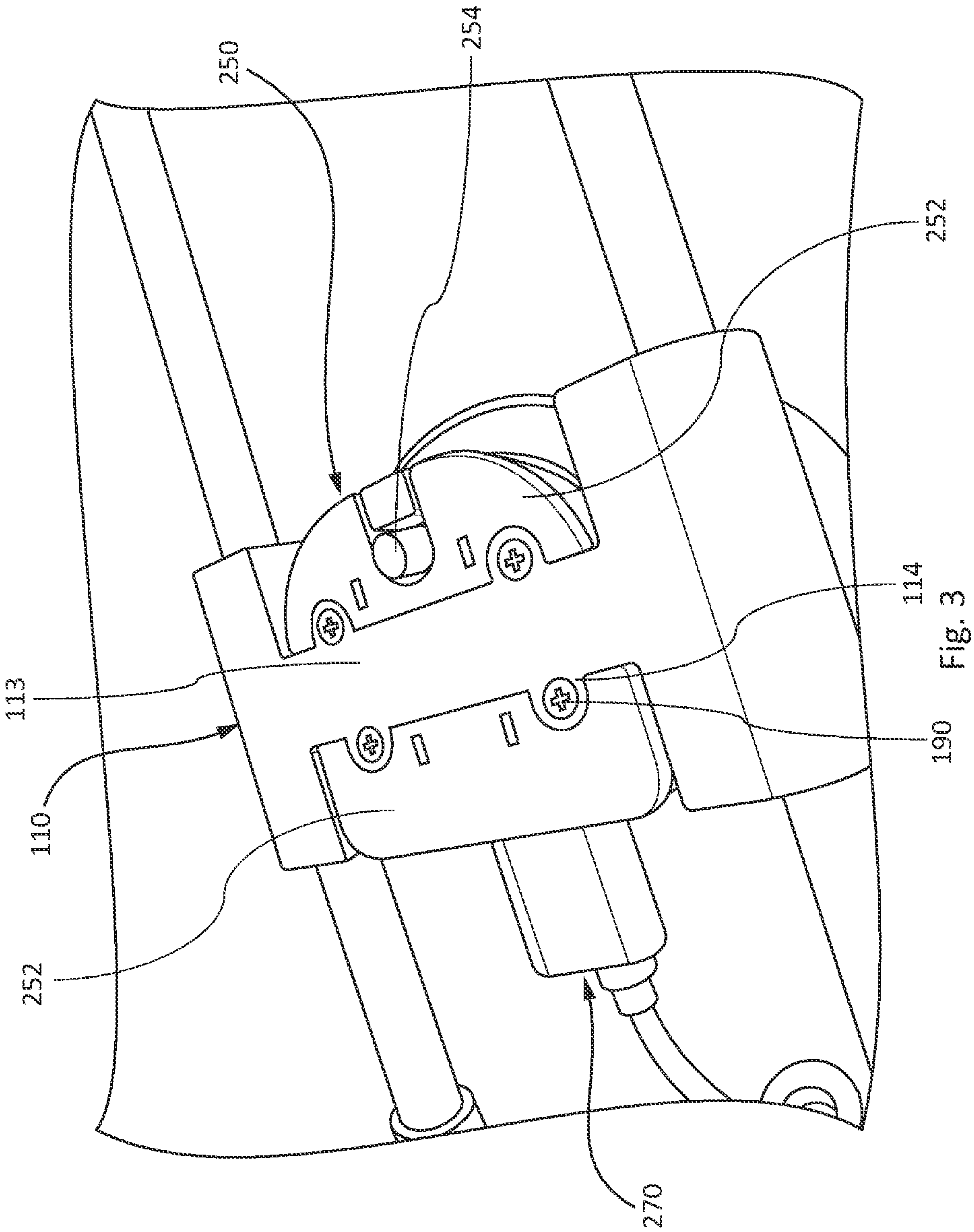
FIG. 3 illustrates a close-up top view of a portion of the security apparatus coupled to the base.

An embodiment of a recoil security apparatus (“security apparatus”) 100 is shown in FIGS. 1-3, and generally comprises a body 110, a first holder 120, a second holder 140, and at least two holder supports 116, 118 that support and couple the first and second holders 120, 140 to the body 110.

The body 110 includes two (2) support housings 130 extending along a support housing axis L and configured to at least partially house and to couple the first and second holder supports 116, 118 to the body 110. The top surface 113 of the body 110 defines a plurality of openings or anchor points 114 each configured to accept a fastener 190 to couple the body 110 to one or more base portions 200, 250. As shown, the anchoring points 114 are positioned between the support housings 130, however in other embodiments, the anchoring points 114 may be alternately positioned in relation to the support housings 130 to accommodate a variety of security requirements.

The first and second holder supports 116, 118 extend from the support housings 130 to the first and second holders 120, 140, respectively. As shown, the first and second holder supports 116, 118 generally extend along or parallel to the support housing axis L, however in other embodiments, the first and second holder supports 116, 118 may extend along an axis that is not parallel to the support housing axis L. Referring specifically to the embodiments of FIGS. 1 and 2, two (2) first holder supports 116 are used to support the first holder 120, however in other embodiments, only one first holder support 116 may be used.

Figure 4:
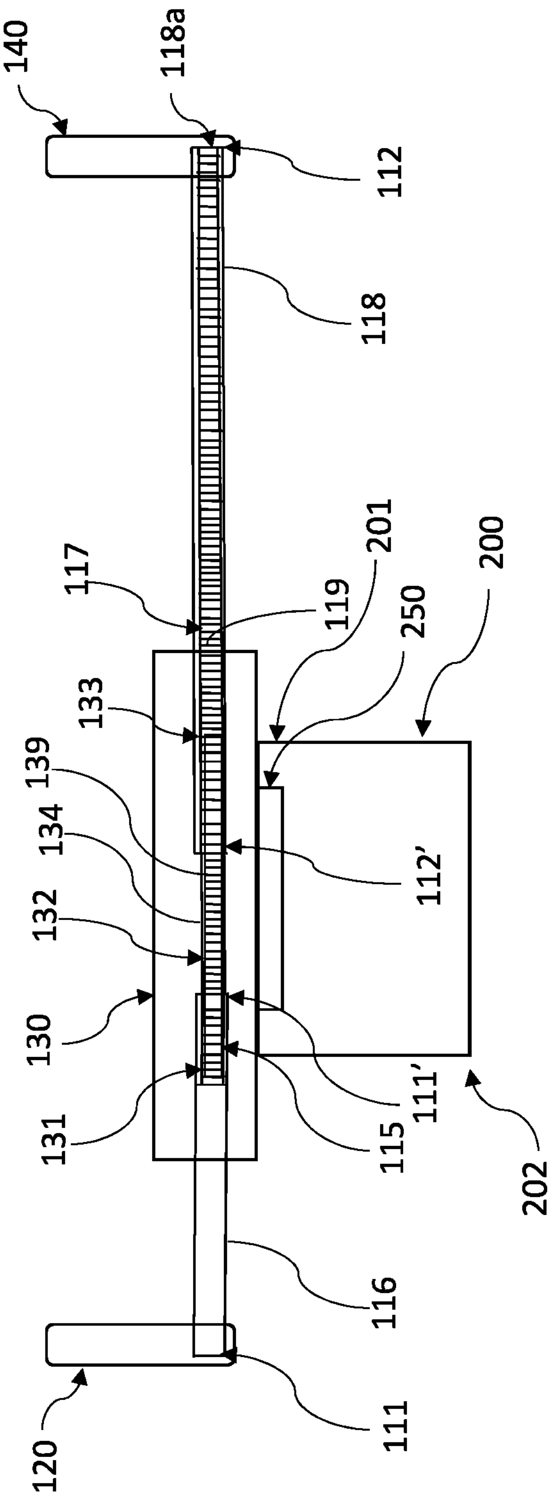
FIG. 4 illustrates a partial cross-section schematic view of an embodiment of the security apparatus coupled to the base.

Referring to FIGS. 1, 2, and 4, each support housing 130 defines a bore 132 that extends through the support housing 130 and generally extends along a support housing axis L. The first holder supports 116 each have a first end 111' positioned within the bore 132 and coupled to the support housing 130. The second, opposing end 111 of the first holder supports 116 is coupled to the first holder 120 at a first support coupler 128. The first holder supports 116 may each comprise a recess 115 extending from the first end 111' along the first holder support axis. The recess 115 may define a plurality of surface features or engagement features 119 such as threads. In an embodiment, the body 110 and the first holder supports 116 are formed as a single unitary component such that the first holder supports 116 do not move relative to the body 110.

The first holder 120 is removeably coupled to the first holder supports 116 at the first support couplers 128. In this manner, a first holder 120 having a first configuration may be removed and replaced with first holder having a second and different configuration. As shown in FIG. 2, an embodiment of the first holder 120 may comprise an end plate 126 with a bottom lip 122 extending from the bottom portion of the end plate 126 and a top lip 124 extending from a top portion of the end plate 126. The end plate 126, bottom lip 122, and the top lip 124 define a pocket configured to support and retain a portion of a portable electronic device. The end plate 126 may define one or more access openings 129 to enable access to one or more buttons or ports of the retained portable electronic device.

Still referring to FIGS. 1, 2, and 4, two second holder supports 118 are used to support the second holder 140, however in other embodiments, only one second holder support 118 may be used. The second holder supports 118 may each have a first end 112' positioned within the bore 132 of the support housing 130. The second, opposing end 112 of each of the second holder supports 118 is coupled to the second holder 140 at a second support coupler 148. It can be appreciated that the position of the first support coupler(s) 128 and the second support coupler(s) 148 may vary in alternate embodiments of the security apparatus 100. The second holder supports 118 define a central shaft 117 that extends from the first end 112' to the second end 112. The central shaft 117 defines a plurality of surface or engagement features 119, such as threads. A securing member 134 is positioned within and traverses the bore 132 of each support housing 130. A first end 131 of the securing member 134 is positioned within the recess 115 of a first holder support 116 and an opposing second end 133 of the securing member 134 is positioned within the shaft 117 of a corresponding second holder support 118. The securing member 134 comprises a plurality of complimentary engagement features 139 defined on an exterior surface that are configured to cooperate with the engagement features 119 of the recess 115 and the shaft 117. The securing member 134 is configured to couple one of the first holder supports 116 with one of the second holder supports 118 and is further configured to rotate relative to the first and second holder supports 116, 118.

Similar to the first holder 120, the second holder 140 is removeably coupled to the second holder supports 118 at the second support couplers 148. Accordingly, both the first holder 120 and the second holder 140 may be interchanged or replaced with differently configured/proportioned holders to accommodate a variety of portable electronic devices (not shown). As shown in FIG. 1, the second holder 140 may generally comprise an end plate 146 with a bottom lip 142 extending from the bottom portion of the end plate 146 and a top lip 144 extending from a top portion of the end plate 146. The end plate 146, bottom lip 142, and the top lip 144 define a pocket configured to support and retain a portion of a portable electronic device (not shown). The end plate 146 may define one or more access openings to enable access to one or more buttons or ports of the retained portable electronic device (not shown).

The body 110 may be coupled to a pedestal or base 200 that is configured to be secured to a display surface (not shown). Referring generally to FIGS. 3-7, the base 200 may directly couple to the body 110 or as will be described further, may comprise a separate body coupling portion 250 configured to couple the body 110 to the base 200. In the embodiments shown, the base 200 comprises a top portion 201 defining a top surface 206 and a bottom portion 202 defining a bottom surface 212. As shown especially in FIGS. 6 and 7, the base 200 may further comprise an exterior surface 204 and an inner surface 208 which defines a chamber 209. The chamber 209 is dimensioned to at least partially accept the body coupling portion 250 and inhibit lateral movement of the body coupling portion relative to the base 200. The body coupling portion 250 may connected to the base 200 via a connector or tether 210 that is configured to extend as the body coupling portion 250 is pulled from the base 200 and retract as the body coupling portion 250 brought back into contact and seated at least partially within the chamber 209 of the base 200.

Figure 5:
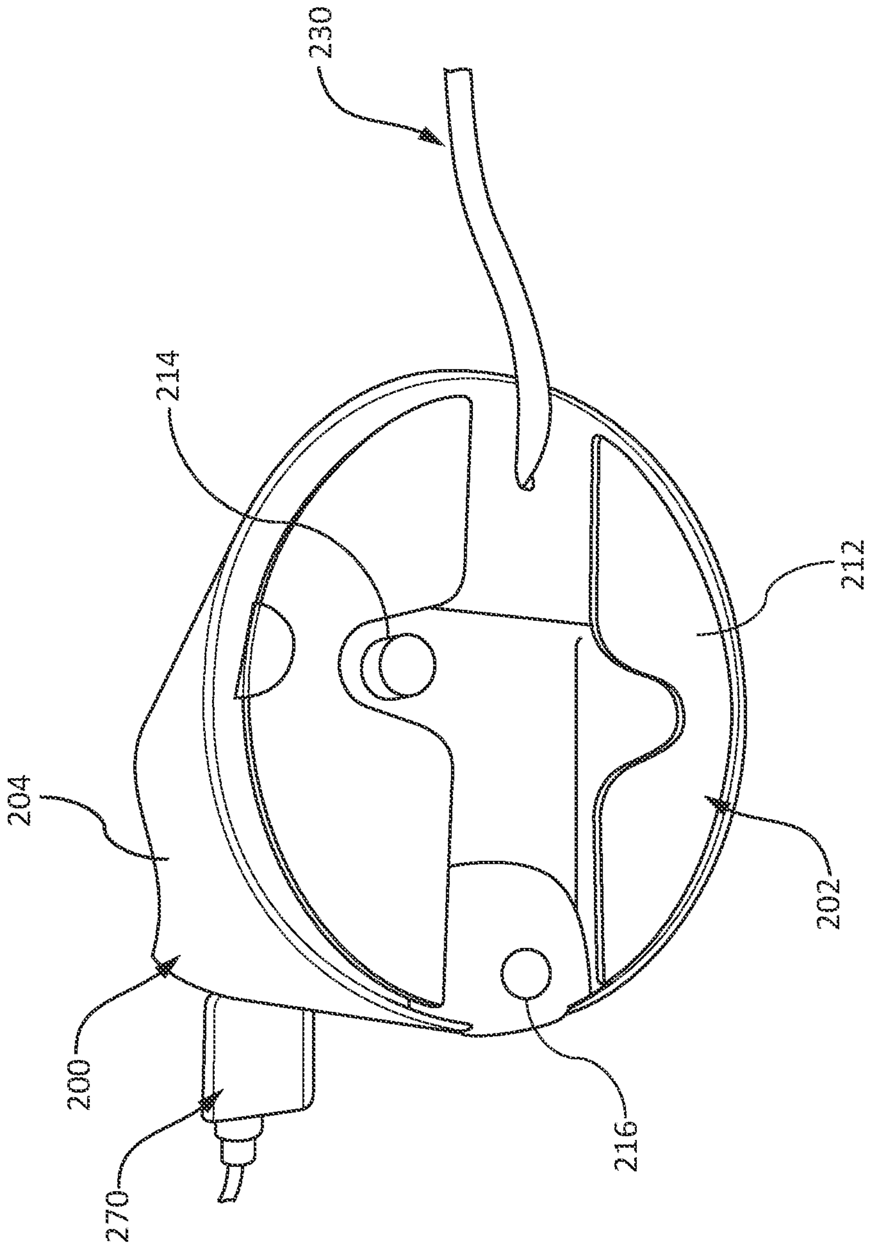
FIG. 5 illustrates a perspective bottom view of an embodiment of the base.
Figure 6:
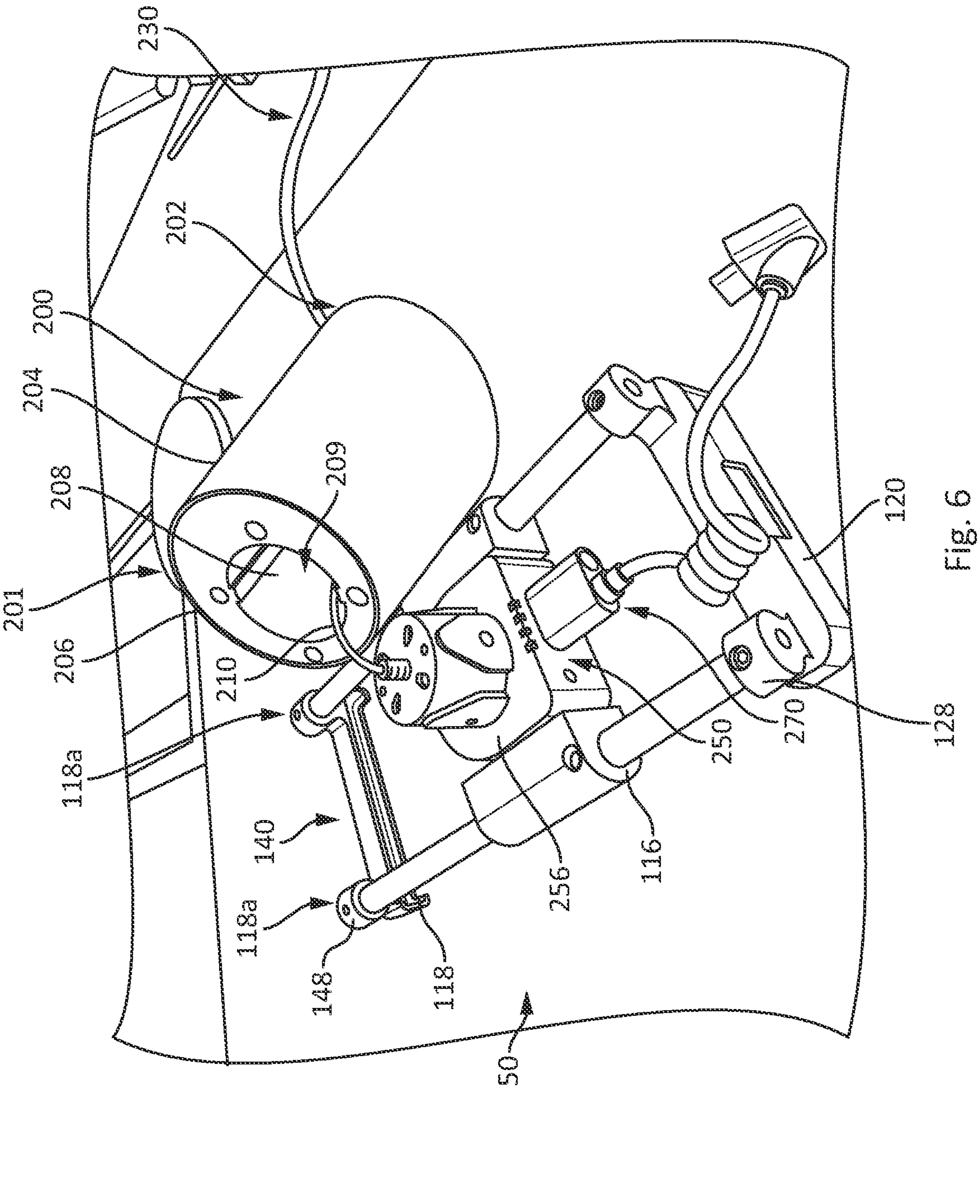
FIG. 6 illustrates a perspective side view of an embodiment of the security apparatus coupled to the base.
Figure 7:
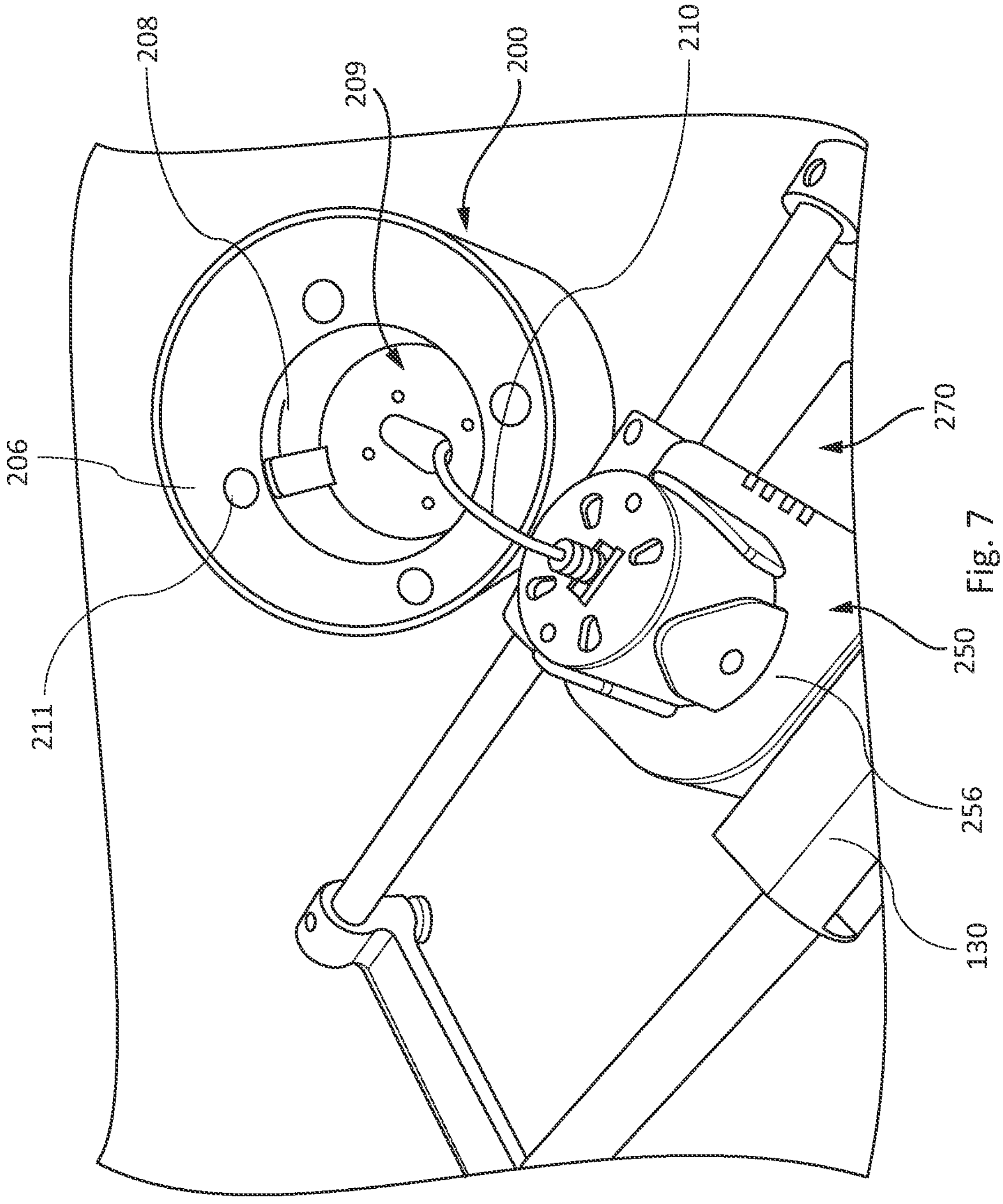
FIG. 7 illustrates a perspective side view of an embodiment of the security apparatus coupled to the base.

The bottom surface 212 of the base 200 is configured to contact the display surface 50 when the base is secured to the display surface 50. An alarm trigger 214 is positioned on the bottom surface 212 of the base 200 and is configured to be depressed in order to arm the alarm such that the alarm remains armed as long as the bottom surface of the base 200 is in contact with the display surface 50 such that the alarm trigger 214 remains depressed. If the alarm trigger 214 is released from the depressed state, then an alarm is triggered. The alarm may be an audible alarm, a visual alarm, and/or a silent alarm. As shown in FIG. 5, the alarm trigger 214 is in the undepressed or triggered state. The base 200 may further comprise a power supply or power input 230 as well as an LED 216 configured to indicate the position of the alarm trigger 214 (254) and/or a lack of power supply.

The body coupling portion 250 includes a top surface 252 (FIG. 3) configured to be coupled to the body 110 of the security apparatus 100. The top surface 252 may define one or more surface features to assist in the positioning and/or coupling of the body 110. An alarm trigger 254 is positioned on the top surface 252 and, similar to the alarm trigger 214 of the base 200, is configured to be depressed in order to arm the alarm such that the alarm remains armed as long as the portable electronic device (not shown) is secured within the security apparatus and therefore contacting and depressing the alarm trigger 254. The alarm trigger 254 is triggered when it is in the undepressed state. As shown in FIG. 3, the alarm trigger 254 is in the undepressed or triggered state.

The body coupling portion 250 may further include a wireless charger to enable wirelessly charge or power the portable electronic device (not shown) retained with the security apparatus 100. The bottom surface 256 of the body coupling portion 250 may comprise one or more coupling elements configured to cooperate with one or more complimentary coupling elements 211 positioned on the top surface 206 of the base 200 to removeably couple the body coupling portion 250 to the base 200. In an embodiment, the coupling elements and complimentary coupling elements 211 comprise magnets, a nut/bolt combination or any other suitable means of removeably securing the base 200 to the display surface 50. A power input 270 may be provided that is configured to couple or plug into the body coupling portion 250. In other embodiments, the power input 270 may couple or plug into the base 200. Decoupling the power input 270 may further trigger the alarm function. Triggering the alarm function of the body coupling portion 250 and/or the base 200 may comprise an auditory, visual, and/or electronic signal.

In order to set up the security apparatus 100 to secure a portable electronic device, the base 200 (and body coupling portion 250) are secured to the display surface 50. The security apparatus 100 is then secured to the body coupling portion 250 using one or more fasteners 190 (FIG. 3). The security apparatus 100 is opened by rotating the securing member 134 in a first direction. Rotation of the securing member 134 in the first direction causes the second holder supports 118 to move in a direction such that the second holder 140 is driven away from the body 110. The portable electronic device is positioned within the security apparatus 100 such that it depresses the alarm trigger 254 and one end is secured in the pocket of the first holder 120. The securing member 134 is then rotated in the second direction to move the second holder supports 118 in an opposing direction to drive the second holder 140 towards the body 110 and retain a second end of the portable electronic device within the second holder 140. As seen in FIG. 4, the first end 112 of each of the second holder supports 118 defines an opening **118*a* into the shaft 117. An end of the securing member 134 is positioned within the shaft 117 such that it can only be contacted and rotated using a proprietary tool. When the portable electronic device is retained by the security apparatus 100, the anchor points 114 are not accessible and the first and second holder supports 116, 118** are positioned such that the sides of the portable electronic device are accessible to the customer. This enables secure display of portable electronic devices with wrap-around displays such that the entire display is accessible to a customer.

Figure 8:
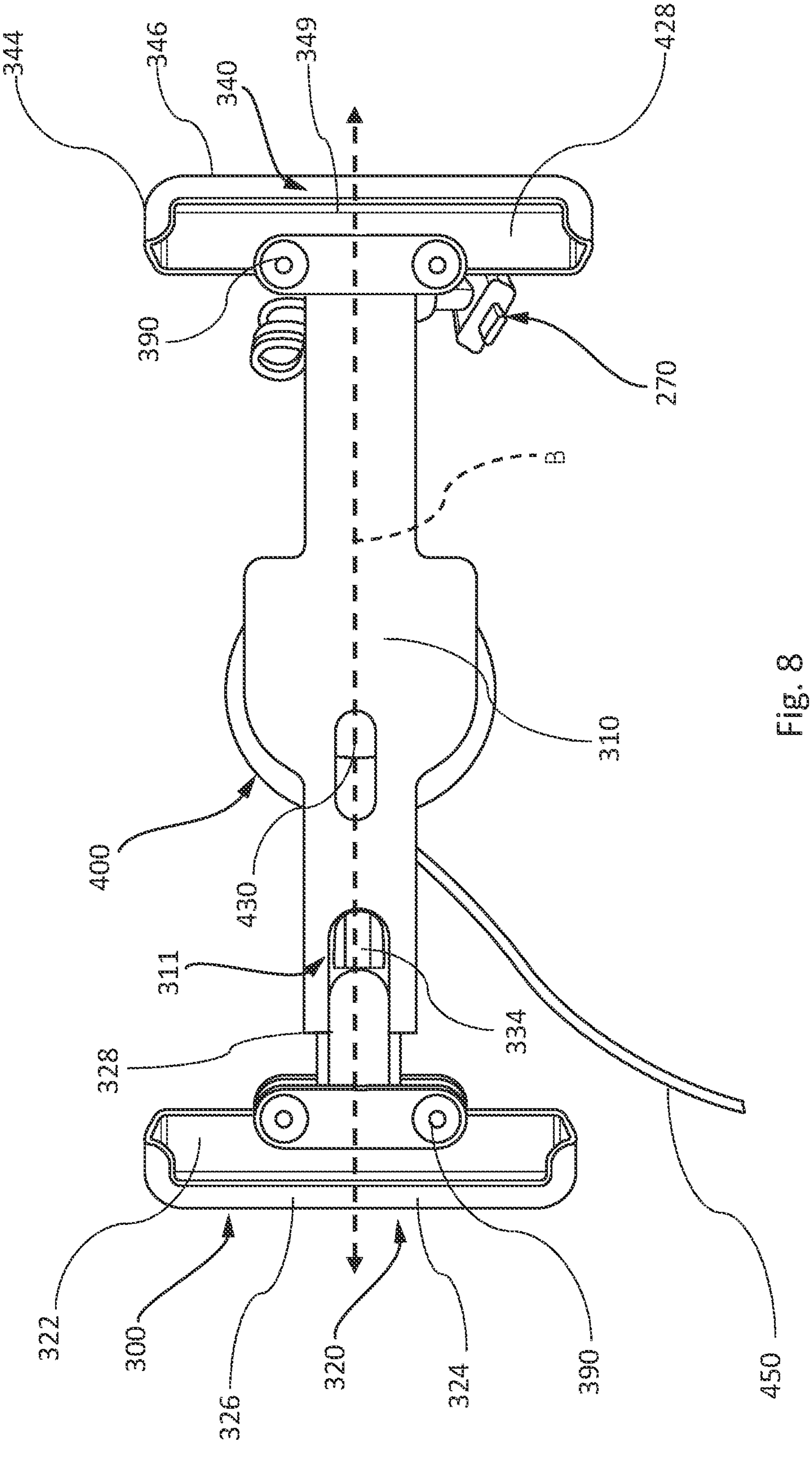
FIG. 8 illustrates a top plan view of another embodiment of the security apparatus coupled to a base.
Figure 9:
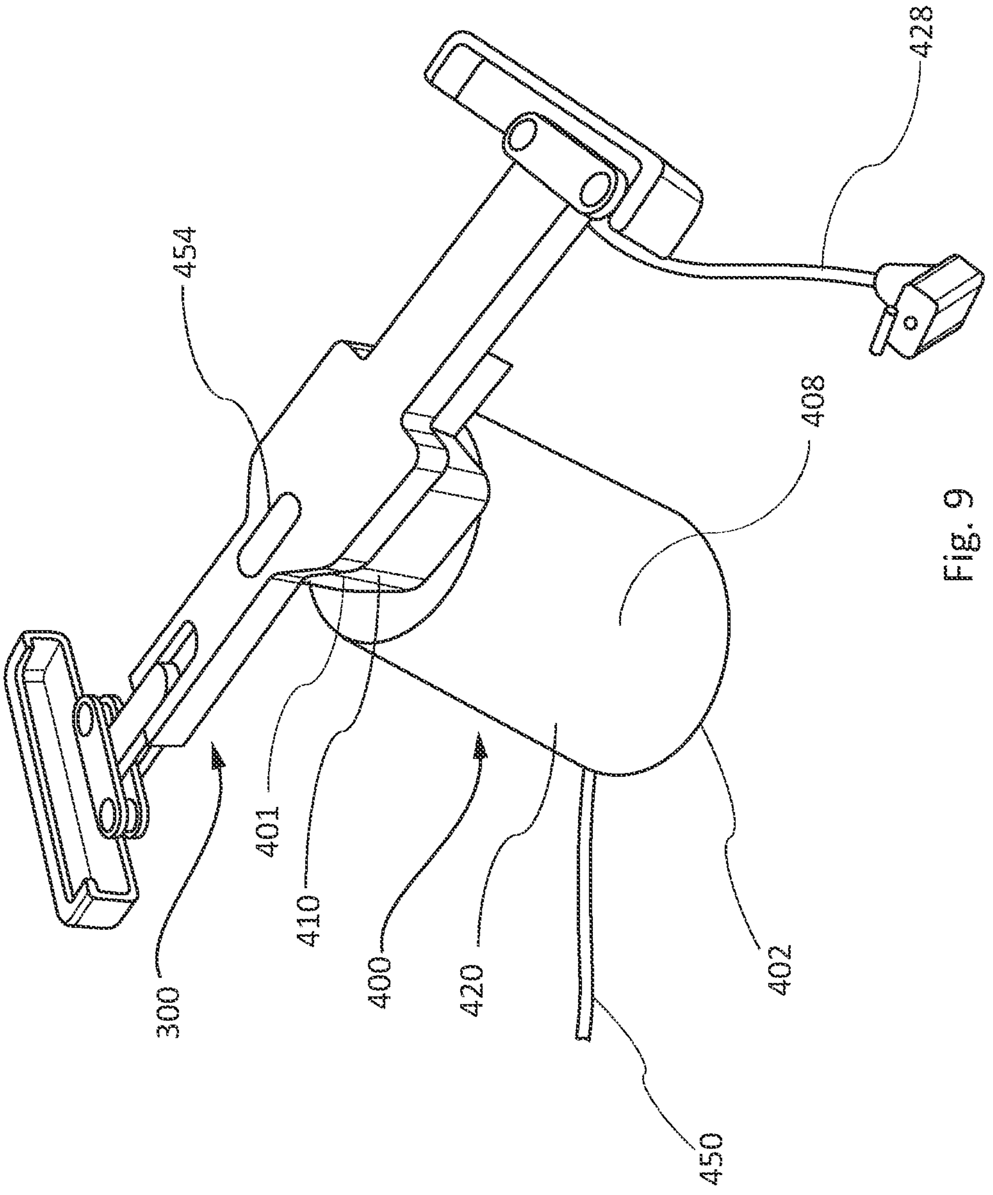
FIG. 9 illustrates a side perspective view of an embodiment of the security apparatus coupled to a base.
Figure 10:
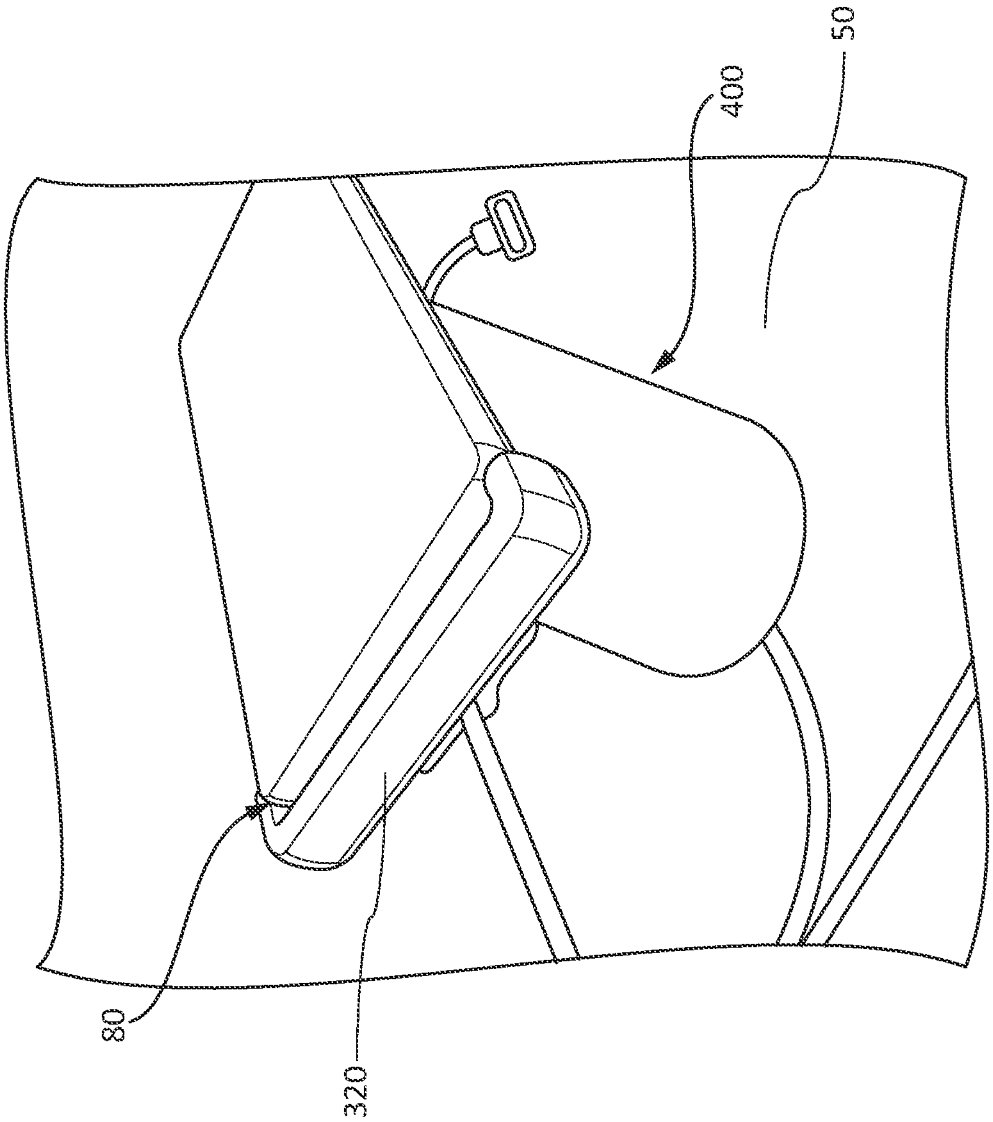
FIG. 10 illustrates a top perspective view of an embodiment of the security apparatus coupled to a base and holding a portable electronic device.

Turning to FIGS. 8-10, an alternate embodiment of the security apparatus 300 is shown coupled to a base 400. As shown, the security apparatus 300 includes a body 310 configured to couple to the base 400. In an embodiment the body 310 may fixedly or removeably couple to the base 400. In another embodiment, the body 310 may be fixed relative to the base 400 and unable to move relative to the base 400. The security apparatus 300 further includes a first holder 320 and a second holder 340. The first holder 320 may have an end plate 326 with a bottom lip 322 extending from the bottom portion of the end plate 326 and a top lip 324 extending from a top portion of the end plate 326. The end plate 326, bottom lip 322, and the top lip 324 define a pocket configured to support and retain a portion of a portable electronic device 80 (FIG. 10). The end plate 326 may define one or more access openings to enable access to one or more buttons or ports of the retained portable electronic device. The first holder 320 is removeably coupled to a first holder support 328 using one or more fasteners 390. As shown in FIG. 8, the body 310 may define a notch 311 that at least partially accepts the first holder support 328 as the first holder 320 is moved relative to the body 310.

The second holder 340 may be removeably coupled to the body 310 using one or more fasteners 390. Accordingly, both the first holder 320 and the second holder 340 may be interchanged or replaced with differently configured/proportioned holders to accommodate a variety of portable electronic devices. The second holder 340 may generally comprise an end plate 346 with a bottom lip 342 extending from the bottom portion of the end plate 346 and a top lip 344 extending from a top portion of the end plate 346. The end plate 346, bottom lip 342, and the top lip 344 define a pocket configured to support and retain a portion of a portable electronic device 80. The end plate 346 may define one or more access openings 349 to enable access to one or more buttons or ports of the retained portable electronic device (not shown). As shown, the first holder 320 and the second holder 340 are similar to other holders described herein, however one skilled in the art would realize that the first holder 320 and the second holder 340 may be configured differently in order to accommodate different portable electronic devices.

The body 310 may be coupled to a pedestal or base 400 that is configured to be secured to a display surface 50. In this embodiment, the base 400 directly couples to the body 310, however the base 400 may comprise a separate body coupling portion that couples the body 310 to the base 400 such as previously described embodiments. The base 400 generally has a top end 401 that couples to the body 310 and a second end 402 that is configured to contact and be secured to the display surface 50. The base 400 may be configured in any number of ways in order to accommodate alternate designs/sizes of the security apparatus 300. As shown particularly in FIG. 9, an embodiment of the base 400 may comprise a body securing portion 410 that contacts or secures the body 310, and a base support portion 420 that supports the body securing portion 410 and secures the base 400 to the display surface 50. The base 400 or the base support portion 420 includes an exterior surface 404 that may define an inner cavity or channel (not shown) that is configured to at least partially house a power supply/power cord 428, 450, an alarm, and various other electronic and mechanical components.

The second end 402 of the base 400 has a bottom surface that is configured to contact the display surface 50 when the base 400 is secured to the display surface 50. Similar to other embodiments previously discussed, an alarm trigger may be positioned on the bottom surface of the base 400 and is configured to be depressed in order to arm the alarm. Accordingly, the alarm remains armed but untriggered as long as the bottom surface of the base 400 is in contact with the display surface 50 such that the alarm trigger remains depressed. If the alarm trigger is released from the depressed state, then an alarm is triggered. Another alarm trigger 454 may be positioned at a top end 401 of the base 400 and is configured to be held in a depressed state when a portable electronic device 80 is secured by the security apparatus 300. The alarm may be an audible alarm, a visual alarm, and/or a silent alarm. The base 400 may further comprise a power supply or power input 450 as well as an LED configured to indicate the position of the alarm triggers 454 and/or a lack of power supply.

The body 310 is configured to support a second holder 340 at one end and a first holder 320 at an opposing end. Similar to other embodiments described, the body 310 defines a shaft or bore that extends along the base axis B. A securing member 334 traverses the shaft and includes a plurality of surface features that are complimentary to surface features defined by the shaft. In an embodiment, the surface features are a plurality of threads that engage a plurality of complimentary threads defined by on an interior surface of the shaft. Many of the components associated with the function of the security apparatus 300 are similar to these previously described and shown in FIG. 4. A first end of the securing member 334 is positioned within a recess of a first holder support 328 and an opposing second end of the securing member 334 is positioned proximate the second holder 340. The securing member 334 is configured to couple the first holder support 328 with the second holder 340 and is further configured to rotate within the shaft relative to the first holder support 328 and the second holder 340.

In order to set up the security apparatus 300 to secure a portable electronic device 80, the security apparatus 300 is secured to the body securing portion 410 of the base 400 and the is secured to the display surface 50. The security apparatus 300 is then opened by rotating the securing member 334 in a first direction. Rotation of the securing member 134 in the first direction causes the first holder support 328 to move in a direction such that the first holder 320 is driven away from the body 310 as shown in FIG. 10. The portable electronic device 80 is positioned within the security apparatus 300 such that it depresses the alarm trigger 454 and one end is secured in the pocket of the second holder 340. The securing member 334 is then rotated in the second direction to move the first holder support 328 in an opposing direction to drive the first holder 320 towards the body 310 and retain a second end of the portable electronic device 80 within the first holder 320. An end of the securing member 334 is positioned within the shaft such that it can only be contacted and rotated using a proprietary tool. When the portable electronic device 80 is retained by the security apparatus 300, the points of attachment of the body 310 to the base 400 are not accessible. In addition, the first holder support 328, the body 310, and the second holder 340 are positioned such that the sides of the portable electronic device 80 are accessible to the customer. This enables secure display of portable electronic devices with wrap-around displays such that the entire display is accessible to a customer.

As shown, one or more of the components of the security apparatuses 100, 300 and bases 200, 400 may be formed as a single unitary component. In and embodiment, one or more of the components of the security apparatuses 100, 300 and bases 200, 400 may be comprised of steel, zinc, or any other suitable metal or metal alloy.

While the present invention has been particularly shown and described with reference to certain exemplary embodiments, it will be understood by one skilled in the art that various changes in detail may be effected therein without departing from the spirit and scope of the invention that can be supported by the written description and drawings. Further, where exemplary embodiments are described with reference to a certain number of elements, it will be understood that the exemplary embodiments can be practiced utilizing either less than or more than the certain number of elements.

The invention claimed is:

1. A security apparatus for securing a portable electronic device, comprising:

a body extending along a body axis comprising an inner surface defining a bore extending along the body axis;

a first holder supported by a first holder support;

a second holder supported by a second holder support; and a securing member extending through the bore from a first end to a second end, wherein the first end is configured to engage the first holder support and the second end is configured to engage the second holder support, wherein the first and second holder support are configured to be at least partially position in the bore, wherein rotation of the securing member in a first direction causes one of the first holder and the second holder to move in a direction such that it is driven away from the body, and wherein rotation of the securing member in a second direction causes one of the first holder and the second holder to move in a direction such that it is driven toward the body.

2. The security apparatus of claim 1, wherein the body is configured to be coupled to a base and the base is configured to be secured to a display surface.

3. The security apparatus of claim 2, further comprising an alarm.

4. The security apparatus of claim 1, wherein the first holder and the second holder are removeably coupled to the body.

5. The security apparatus of claim 1, wherein at least one of the first holder and the second holder further comprises, an end plate, a bottom lip extending from a bottom of the end plate, and a top lip extending from a top of the end plate.

6. The security apparatus of claim 1, wherein at least one of the first holder and the second holder defines a pocket configured to support and retain a portion of a portable electronic device.

7. The security apparatus of claim 1, wherein at least one of the first holder and the second holder defines an opening configured to enable access to a power input of the portable electronic device.

8. The security apparatus of claim 1, wherein the movement of one of the first and second holders results in a movement of one of the first and second holder supports within the bore and relative to the bore.

9. A system for securing a portable electronic device, the system comprising:

a security apparatus comprising, a body extending along a body axis comprising an inner surface defining a bore extending along the body axis, a first holder supported by a first holder support, a second holder supported by a second holder support, and a securing member extending through the bore from a first end to a second end, wherein the first end is configured to engage the first holder support and the second end is configured to engage the second holder support;

a base comprising a top surface configured to support the body of the security apparatus and a bottom surface configured to couple to a display surface; and an alarm comprising, at least one alarm trigger positioned on at least one of the base and the body; and at least one sensor in communication with the at least one alarm trigger and configured to cause at least one of an audio, a visual, and an electronic signal to be produced in response to tripping the at least one alarm trigger, wherein the first and second holder support are configured to be at least partially position in the bore.

10. The system of claim 9, wherein the at least one alarm trigger is positioned on the bottom surface of the base and is configured to be depressed when the base is coupled to the display surface.

11. The system of claim 9, wherein the body coupled to the base using a tether to enable the body to be removed from the base while still being coupled to the base.

12. The system of claim 9, wherein the first holder and the second holder are removeably coupled to the body.

13. The system of claim 9, further comprising a power input on at least one of the base and the body.

14. The system of claim 9, wherein at least one of the first holder and the second holder defines a pocket configured to support and retain a portion of a portable electronic device.

15. The system of claim 9, wherein rotation of the securing member in a first direction causes one of the first holder and the second holder to move in a direction such that it is driven away from the body, and wherein rotation of the securing member in a second direction causes one of the first holder and the second holder to move in a direction such that it is driven toward the body.

16. The system of claim 9, wherein movement of the one of the first and second holders results in a movement of one of the first and second holder supports within the bore and relative to the bore.

17. A method of manufacturing a security apparatus, comprising:

structuring a body to extending along a body axis and comprise an inner surface defining a bore that extends along the body axis;

structuring a first holder to be supported by a first holder support;

structuring a second holder to be supported by a second holder support; and structuring a securing member to extend through the bore from a first end to a second end;

structuring the first end to engage the first holder support and structuring the second end to engage the second holder support; and structuring the first and second holder support to be at least partially position in the bore;

wherein rotation of the securing member in a first direction causes one of the first holder and the second holder to move in a direction such that it is driven away from the body, and wherein rotation of the securing member in a second direction causes one of the first holder and the second holder to move in a direction such that it is driven toward the body.

18. The method of claim 17, further comprising structuring the one of the first and second holders to move in response to a movement of one of the first and second holder supports within the bore and relative to the bore.

19. The method of claim 17, further comprising structuring the body to be coupled to a base and structuring the base to be secured to a display surface.

20. The method of claim 19, further comprising structuring the body to be coupled to a base using a tether to enable the body to be removed from the base while still being coupled to the base.

* * * * *